United States Patent
Du et al.

(10) Patent No.: US 12,332,666 B1
(45) Date of Patent: Jun. 17, 2025

(54) SAMPLING METHOD FOR SURFACE SEDIMENTS IN INTERTIDAL ZONE BASED ON UNMANNED AERIAL VEHICLE PLATFORM

(71) Applicant: FIRST INSTITUTE OF OCEANOGRAPHY, MINISTRY OF NATURAL RESOURCES, Shandong (CN)

(72) Inventors: Jun Du, Shandong (CN); Ziwen Tian, Shandong (CN); Guoqiang Xu, Shandong (CN); Yuxiu Jin, Shandong (CN); Qian Li, Shandong (CN)

(73) Assignee: FIRST INSTITUTE OF OCEANOGRAPHY, MINISTRY OF NATURAL RESOURCES, Qingdao (CN)

( * ) Notice: Subject to any disclaimer, the term of this patent is extended or adjusted under 35 U.S.C. 154(b) by 0 days.

(21) Appl. No.: 18/991,670

(22) Filed: Dec. 22, 2024

Related U.S. Application Data

(63) Continuation of application No. PCT/CN2024/107792, filed on Jul. 26, 2024.

(51) Int. Cl.
  G05D 1/667 (2024.01)
  G01N 1/08 (2006.01)
  (Continued)

(52) U.S. Cl.
  CPC .............. G05D 1/667 (2024.01); G01N 1/08 (2013.01); G05D 1/243 (2024.01);
  (Continued)

(58) Field of Classification Search
  CPC .... G05D 1/667; G05D 1/243; G05D 2105/80; G05D 2111/10; G05D 2107/27; G01N 1/08
  See application file for complete search history.

(56) References Cited

U.S. PATENT DOCUMENTS 5,032,794 A * 7/1991 Ridd ............... G01V 3/06
324/365

FOREIGN PATENT DOCUMENTS

| CN | 109000982 A | 12/2018 |
|---|---|---|
| CN | 110641690 A | 1/2020 |

(Continued)

OTHER PUBLICATIONS

The first search report dated Apr. 19, 2024 in SIPO application No. 2023106470512.

(Continued)

*Primary Examiner* — Matthew J. Reda

(57) ABSTRACT

Provided is a sampling method for surface sediments in an intertidal zone based on an unmanned aerial vehicle platform, including: at low tide, automatically or manually moving an unmanned aerial vehicle to an appropriate height above a sampling position of the surface sediments in the intertidal zone according to a preset waypoint. The unmanned aerial vehicle platform is equipped with a winch, a releaser and a surface sampler. Operation process: the sampler is released, and the sampler is inserted into seabed by gravity to obtain a sample with a specified quality; the unmanned aerial vehicle rises vertically, and uses a lift to take the sample off an intertidal zone ground; the winch is started to recover the sampler to a bottom of the unmanned aerial vehicle; after the completion, the unmanned aerial vehicle automatically or manually returns to an initial position.

6 Claims, 1 Drawing Sheet

(51) Int. Cl.
*G05D 1/243* (2024.01)
*G05D 105/80* (2024.01)
*G05D 107/00* (2024.01)
*G05D 111/10* (2024.01)

(52) U.S. Cl.
CPC ..... *G05D 2105/80* (2024.01); *G05D 2107/27* (2024.01); *G05D 2111/10* (2024.01)

(56) References Cited

FOREIGN PATENT DOCUMENTS

| | | | | |
|---|---|---|---|---|
| CN | 111473999 A | 7/2020 | | |
| CN | 112067349 A | 12/2020 | | |
| CN | 113203432 A | 8/2021 | | |
| CN | 114560079 A | 5/2022 | | |
| CN | 115508129 A | 12/2022 | | |
| CN | 116659935 A | * 8/2023 | .............. | B64D 1/02 |
| KR | 101736496 B1 | 5/2017 | | |

OTHER PUBLICATIONS

Supplementary search report dated Jun. 14, 2024 in SIPO application No. 2023106470512.
Notification to Grant Patent Right for Invention dated Jun. 19, 2024 in SIPO application No. 2023106470512.
International Search Report issued in corresponding PCT Application No. PCT/CN2024/107792 dated Sep. 26, 2024.

* cited by examiner

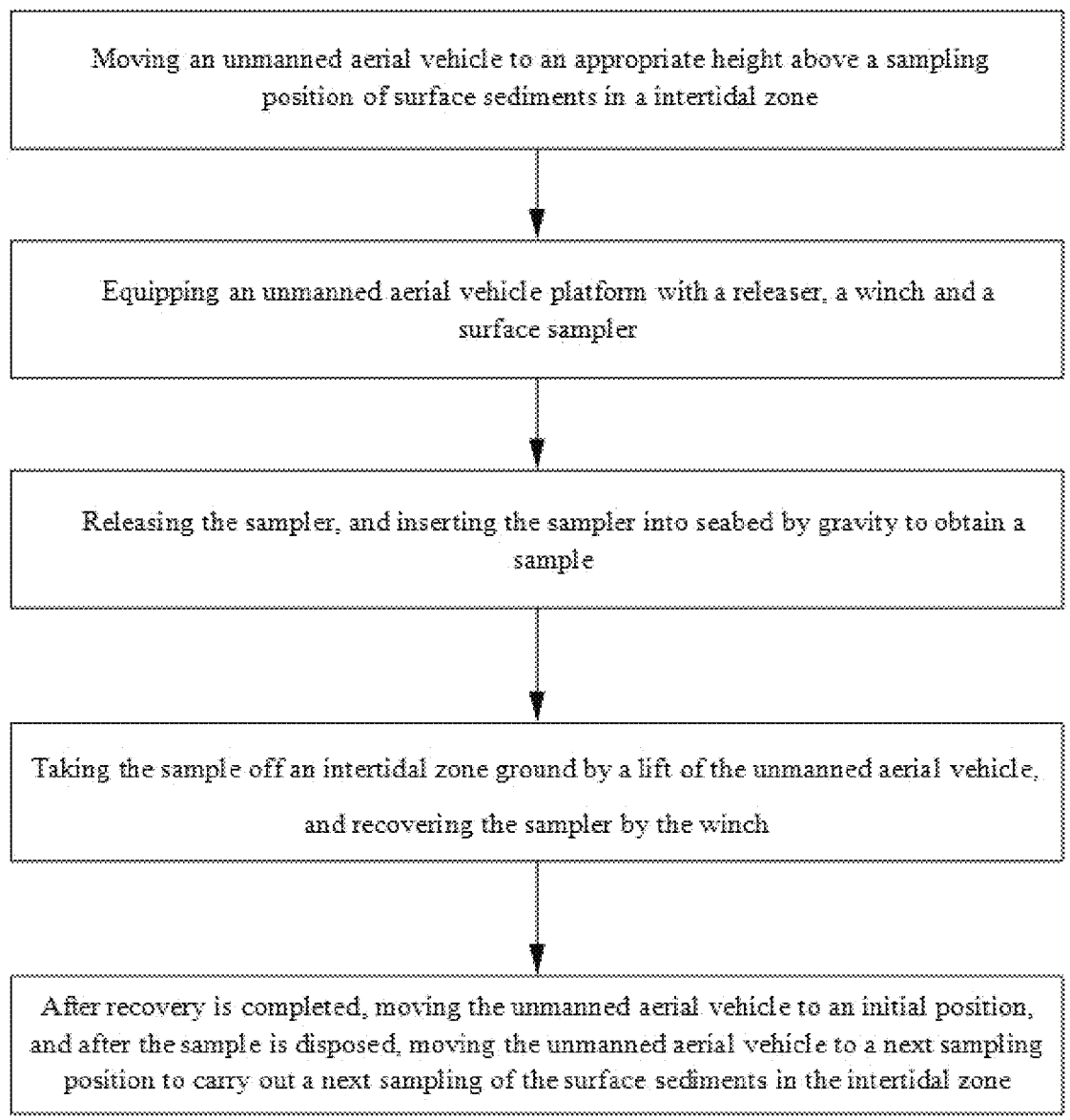

SAMPLING METHOD FOR SURFACE SEDIMENTS IN INTERTIDAL ZONE BASED ON UNMANNED AERIAL VEHICLE PLATFORM

CROSS-REFERENCE TO RELATED APPLICATIONS

This disclosure is a continuation of PCT/CN2024/107792, filed Jul. 26, 2024 and claims priority to Chinese Patent Application No. 202310647051.2, filed on Jun. 1, 2023, the contents of which are hereby incorporated by reference.

TECHNICAL FIELD

The disclosure relates to the technical field of surface sediment sampling in the land-water interaction zone, and in particular to a sampling method for surface sediments in an intertidal zone based on an unmanned aerial vehicle platform.

BACKGROUND

Sampling of seabed surface sediments is one of the main means for marine investigation and research. Generally speaking, according to the shape of sampler, the sampling of seabed surface sediments may be divided into two types: clam sampling and box sampling. The sampling of seabed surface sediments mainly depends on the ship base. The manual or electric winch is set up on the side of the ship, and the sampler is connected by the steel cable. When the sampler is lowered within a range of 5-10 meters (m) from the seabed, the winch is loosened to release the sampler, and the sampler is inserted into the seabed and closed by gravity. The investigation team member uses the winch to recover the sampler, and takes out the sample in the sampler for sealing and marking, so as to carry out the next scientific research work.

Intertidal zone belongs to one of the special areas for sampling seabed surface sediments. Intertidal zone refers to the area between the average highest tidal level and the lowest tidal level in the coastal area. Simply put, intertidal zone is the seabed that may be periodically submerged by seawater (lake water) under the action of tides. Sediment sampling of intertidal zone has always been a difficult problem for marine workers, especially in intertidal areas dominated by muddy sediments. At low tide, the intertidal zone is easy to collapse because of the soft sediment, so the investigation team member may hardly walk. At high tide, due to the shallow water depth in this area, it is easy to cause the ship to run aground. Moreover, because of the limited high tide time, the working duration of the survey ship is limited, resulting in low sampling efficiency. It may be seen that both direct sampling by manpower and sampling by ship base in this area have potential safety hazards and low efficiency.

SUMMARY

In order to solve the problems existing in the prior art, the disclosure provides a sampling method for surface sediments in an intertidal zone based on an unmanned aerial vehicle platform. The method mainly uses a high-lift unmanned aerial vehicle platform to carry out sampling work of the surface sediments in the intertidal zone near the ocean or lake, improving the efficiency and safety of sampling work.

In order to achieve the above technical objectives, the disclosure provides a following technical scheme: a sampling method for surface sediments in an intertidal zone based on an unmanned aerial vehicle platform, including following steps:
  moving an unmanned aerial vehicle to an appropriate height above a sampling position of the surface sediments in the intertidal zone, where the appropriate height above is preset;
  equipping the unmanned aerial vehicle platform with a releaser, a winch and a surface sampler;
  releasing the sampler, and inserting the sampler into seabed by gravity to obtain a sample;
  taking the sample off an intertidal zone ground by a lift of the unmanned aerial vehicle, and recovering the sampler by the winch; and
  after recovery is completed, moving the unmanned aerial vehicle to an initial position, and after the sample is disposed, moving the unmanned aerial vehicle to a next sampling position to carry out a next sampling of the surface sediments in the intertidal zone.

Optionally, a bottom of the unmanned aerial vehicle is equipped with the releaser, the winch is provided with a steel cable, and the sampler is arranged at an end of the steel cable; and the releaser controls the winch to release and recover the steel cable to drive the sampler to release and recover.

Optionally, a movement of the unmanned aerial vehicle uses manual control or automatic control.

Optionally, in an automatic control mode of the unmanned aerial vehicle, the sampling position is taken as a final position, a position of the unmanned aerial vehicle is taken as an initial position, and obstacle avoidance grids are marked; according to the initial position, the final position and the obstacle avoidance grids, a path is planned by an optimization algorithm, and the unmanned aerial vehicle is automatically controlled through a planned path.

Optionally, before the sampler is released, the method includes: acquiring an image of the sampling position, and judging the image of the sampling position; if a judgment result shows an exposure of surface sediments, manually operating to release the sampler; if the image shows coverage of the sampling position with seawater, manually controlling to wait, move again or return.

Optionally, a judgment is made by the image of the sampling position returned by the unmanned aerial vehicle.

Optionally, a height of the unmanned aerial vehicle is 5-10 m.

Optionally, before the sampler is released, the method also includes hovering the unmanned aerial vehicle through a fixed-point hovering function, where a hovering duration depends on a sampling duration and a battery power of the unmanned aerial vehicle.

The disclosure has following technical effects.

In the prior art, the sampling method by manpower or the ship-based sampling method is used, and the space-based relevant sampling technology is not adopted. Through the space-based sampling of the surface sediments in the intertidal zone, the replacement of manpower or ship-based sampling platforms in the prior art by the unmanned aerial vehicle, the loading of different equipment on the unmanned aerial vehicle, and the adaptive setting of execution flow of the unmanned aerial vehicle and equipment, the disclosure may effectively sample the surface sediments in the intertidal zone along the ocean or lake, improve the safety and effectiveness of sampling work, and improve the sampling efficiency, and has a good application prospect.

BRIEF DESCRIPTION OF THE DRAWINGS

In order to explain the embodiments of the disclosure or the technical schemes in the prior art more clearly, the drawings needed in the embodiments will be briefly introduced below. Obviously, the drawings in the following description are only some embodiments of the disclosure. For ordinary people in the field, other drawings may be obtained according to these drawings without paying creative labor.

The FIGURE is a schematic flow diagram of a method provided by an embodiment of the disclosure.

DETAILED DESCRIPTION OF THE EMBODIMENTS

In the following, the technical schemes in the embodiments of the disclosure will be clearly and completely described with reference to the attached drawings. Obviously, the described embodiments are only a part of the embodiments of the disclosure, but not all the embodiments. Based on the embodiments in the disclosure, all other embodiments obtained by ordinary technicians in the field without creative labor belong to the protection scope of the disclosure.

In order to solve the problems existing in the prior art, the disclosure provides a following scheme.

The disclosure discloses a sampling method for surface sediments in an intertidal zone based on an unmanned aerial vehicle platform, including: at low tide, automatically or manually moving an unmanned aerial vehicle to an appropriate height above a sampling position of the surface sediments in the intertidal zone according to a preset waypoint. An unmanned aerial vehicle platform is equipped with a winch, a releaser and a surface sampler. Operation process are as follows: the sampler is released, and under an action of gravity, the sampler is inserted into seabed to obtain a sample with a specified quality; the unmanned aerial vehicle rises vertically, and the sample is taken off an intertidal zone ground by using lift of the unmanned aerial vehicle; the winch is started to recover the sampler to a bottom of the unmanned aerial vehicle; after the completion, the unmanned aerial vehicle automatically or manually returns to an initial position, and an investigator conducts subsequent sampling, testing and sealing work. The status of the unmanned aerial vehicle is checked and a next round of sampling work is carried out.

As shown in the FIGURE, the disclosure provides a sampling method for surface sediments in an intertidal zone based on an unmanned aerial vehicle platform, where
the surface sediments in the intertidal zone are mainly sampled by the unmanned aerial vehicle platform carrying relevant instruments and equipment; the method includes: moving the unmanned aerial vehicle platform to a sampling position of the surface sediments in the intertidal zone, and adjusting a height of the unmanned aerial vehicle, where the unmanned aerial vehicle is provided with a winch and a sampler; by releasing the sampler, inserting the sampler into seabed by gravity to obtain a sample; taking the sample off a surface by a lift of the unmanned aerial vehicle, and recovering the sampler by the winch; after recovery is completed, moving the unmanned aerial vehicle to an initial position, and after the sample is placed, moving the unmanned aerial vehicle to a next sampling position, and carrying out repeated sampling and recycling work, so as to realize sampling of the surface sediments in the intertidal zone.

The disclosure mainly relies on space base (unmanned aerial vehicle) to sample the surface sediments in the intertidal zone. A sampling device based on the unmanned aerial vehicle used in the disclosure mainly includes an unmanned aerial vehicle, positioning equipment, a releaser, a winch, a steel cable and a sampler, where the unmanned aerial vehicle uses a high-lift rotorcraft, and the positioning equipment is provided on the unmanned aerial vehicle, and the positioning equipment is the standard configuration of the unmanned aerial vehicle, which is not repeated here. A bottom of the unmanned aerial vehicle is equipped with the releaser and the winch, and the steel cable is wound on the winch, and an end of the steel cable is connected with the sampler, where the sampler may be a clam sampler or a box sampler. The configuration of a releaser, winch, connecting steel cable and sampler has also been realized in civil and military helicopters, but the unmanned aerial vehicle has not been equipped with this configuration. In this disclosure, the equipment is set in a high-lift unmanned aerial vehicle for the space-based sampling of the surface sediments in the intertidal zone.

Through the device, the surface sediments in the intertidal zone are sampled. During the sampling process, the unmanned aerial vehicle has a fixed-point hovering function, and a hovering duration depends on a sampling duration and a battery power of the unmanned aerial vehicle. At low tide, the seawater in the intertidal zone recedes and is exposed as land. The sampling unmanned aerial vehicle flies over a sampling point, and descends to a position about 5-10 m away from the seabed. The sampler is released and inserted into the seabed by gravity to obtain a sample, and then the lift of the unmanned aerial vehicle is used to take the sample off the ground. The winch recovers the sampler to the initial position, and then the unmanned aerial vehicle flies back to a position of an investigation team member. A landing gear of the unmanned aerial vehicle is opened and landed safely. The investigation team member gets the sample and carries out the sampling work at the next station.

In the above-mentioned process of sampling the surface sediments in the intertidal zone, the sampling position and time are first determined, different types are marked on a surface area of the intertidal zone, including the types of different sedimentary layers and the predicted distribution of sediments, and the above-mentioned marked areas are divided into grids. The grid size is selected according to manual experience, and the grid contents in different types are selected for uniform sampling grid settings, with the central position of the sampling grid as the sampling position. For the sampling grids with different types of sedimentary layer compositions that are easy to change, more sampling grids are added for more sampling settings to facilitate accurate analysis of sediment data in the surface. At the same time, for the setting of sampling duration, the low tide time is determined by tidal table or professional software, and a certain range under the low tide time is taken as the sampling duration. After the sampling position and sampling duration are determined, the surface sediments in the intertidal zone are sampled according to the sampling position and sampling duration.

After the sampling position is determined, the unmanned aerial vehicle is moved to the above position. In the above content, the unmanned aerial vehicle is moved to the sampling position by manual control or by the related path planning method of the unmanned aerial vehicle, and the manual control controls the flying speed, flying height and flying direction of the unmanned aerial vehicle through the remote controller to move the unmanned aerial vehicle to the sampling position. In the related path planning content, the position of the unmanned aerial vehicle is taken as the initial position, where the initial position may be determined by the positioning equipment, and the sampling position is taken as the final position. After the initial position and final position are determined, the grid with obstacles in the current area are marked by GPS map. After the standard is completed, the grids with obstacles are avoided. Based on the grid where the initial position is located and the grid where the final position is located, the grid path of the unmanned aerial vehicle during flight is planned, and the shortest path through the grids is taken as the flight path, and the shortest path is obtained by an intelligent optimization algorithm. After the acquisition is completed, the unmanned aerial vehicle is automatically controlled to move on the flight path and move to the final position. During the movement, the flight path of the unmanned aerial vehicle is monitored in real time. When the positioning information of the positioning equipment of the unmanned aerial vehicle coincides with the final position information, it is determined to move to the final position, and the flying height of the unmanned aerial vehicle is set in advance before flying, so that the unmanned aerial vehicle may fly at a certain height, and the flying height of the unmanned aerial vehicle is monitored in real time by a ranging sensor at the bottom.

After the unmanned aerial vehicle moves to the above position, whether the seawater in intertidal zone recedes and whether the surface sediments in the intertidal zone are exposed are judged in the area, and the height of the unmanned aerial vehicle is corrected according to the height of the surface. After the unmanned aerial vehicle moves to the initial position, the image at this position is collected by the image sensor installed on the unmanned aerial vehicle, and the image is processed to judge whether the surface sediments are exposed. After the judgment is completed, if the judgment result is that the surface sediments are present, a release signal and a collected image are returned, and the sampler is used for sampling through manual operation control. If the surface sediments are not present, the collected image is returned to relevant personnel for review to judge whether to wait or return to the initial position or directly sample. In the process of judging the image of the surface sediments, a deep learning model is used to detect and classify the image and classify whether whether the surface is exposed. The deep learning model may choose deep learning models such as convolutional neural network, time series convolutional neural network and fast convolutional neural network, and the exemplary convolutional neural network may choose a structure with a plurality of convolutional modules and fully connected layers connected. A program of the deep learning model is burned by a microprocessor mounted on the unmanned aerial vehicle for identification. If the identification shows that the surface sediments are exposed, the sampler is controlled to sample. If the identification shows that the surface sediments are not exposed, the currently judged image is returned to relevant personnel for review. In this case, the control model of the unmanned aerial vehicle is replaced by manual control from automatic control, and the unmanned aerial vehicle is made to wait, return to the initial position or directly sample through remote manual control instructions. The sampling process needs to be at low tide time, but the surface of the intertidal zone under the sampling position at the low tide time may not be completely exposed, and the existence of water on the surface will have a certain impact on the sampling process and the final sampling result. Therefore, it is necessary to avoid sampling when there is water in the intertidal zone as much as possible. At the same time, in order to improve the automatic control mode of the unmanned aerial vehicle, when it is judged that the surface is not exposed, the unmanned aerial vehicle moves to the central position of a plurality of adjacent grids for image judgment again, and records the central position information of adjacent grids. After judging the central position of adjacent grids, if there is a phenomenon of surface exposure, sampling is performed directly through the sampler. If there is still no content exposed on the surface, the control mode will be handed over to remote manual control or choose to return directly, and the collected image data will be transmitted to the relevant personnel for review.

During the sampling process, the flying height of the unmanned aerial vehicle is monitored in real time by the ranging sensor. When the height of the unmanned aerial vehicle is about 5-10 m, sampling is performed directly; if the current height does not belong to this interval, the height information of the unmanned aerial vehicle is collected in real time, and the height is judged in real time; when the height judgment result is in the above interval, the sampler is placed for sampling.

During the sampling process, the sampler uses a clam sampler, a box sampler or other sediment sampler, and is set to hover. The hovering duration depends on the sampling duration and the battery power of the unmanned aerial vehicle. After ensuring the stability of the unmanned aerial vehicle and other equipment, sampling is carried out. When the unmanned aerial vehicle hovers for a certain period of time, the winch is controlled by manual control to release the steel cable freely, and the sampler is vertically lowered on the surface of the intertidal zone, and the sampler is inserted into the seabed to obtain the sample through the own gravity of the sampler. After the sampler obtains the sample, the sampler is moved in stages, and the lifting height of the unmanned aerial vehicle is preset, where the lifting height is twice the length of the sampler. The unmanned aerial vehicle is lifted according to the lifting height, and the lifting process is monitored by the ranging sensor. After the lifting is completed, the unmanned aerial vehicle continues to hover, waiting for the winch to recover the sampler to the initial position at a constant speed. After the sampler is recovered, the unmanned aerial vehicle returns according to the original path or takes the initial position as the initial position again, and takes the return position as the final position to re-plan the path and automatically returns to the place where the relevant personnel are located. During the flight and sampling process of the unmanned aerial vehicle, positioning equipment is also set at the place where the relevant personnel are located, so as to check the distance between the unmanned aerial vehicle and the relevant personnel and provide a return position beacon for the unmanned aerial vehicle.

When the unmanned aerial vehicle returns to the position where the investigator is located, that is, the range position, the landing gear of the unmanned aerial vehicle is opened and safely landed. Through the above scheme, the next station is sampled, and the cycle is repeated until all sampling points are sampled, thus completing the sampling of surface sediments in the intertidal zone.

In the prior art, the sampling method by manpower or the ship-based sampling method is used, and the space-based relevant sampling technology is not adopted. Through the space-based sampling of the surface sediments in the intertidal zone, the replacement of manpower or ship-based sampling platforms in the prior art by the unmanned aerial vehicle, the loading of different equipment on the unmanned aerial vehicle, and the adaptive setting of execution flow of the unmanned aerial vehicle and equipment, the disclosure may effectively sample the surface sediments in the intertidal zone, improve the safety and effectiveness of sampling work, and improve the sampling efficiency, and has a good application prospect.

The above is only the preferred embodiment of the disclosure, but the protection scope of the disclosure is not limited to this. Any change or replacement that may be easily thought of by a person familiar with this technical field within the technical scope disclosed in the disclosure should be included in the protection scope of the disclosure. Therefore, the protection scope of the disclosure should be based on the protection scope of the claims.

What is claimed is:

1. A sampling method for surface sediments in an intertidal zone based on an unmanned aerial vehicle platform, comprising:
    moving an unmanned aerial vehicle to an appropriate height above a sampling position of the surface sediments in the intertidal zone, wherein the appropriate height above is preset;
    equipping the unmanned aerial vehicle platform with a releaser, a winch and a surface sampler;
    releasing a sampler, and inserting the sampler into seabed by gravity to obtain a sample;
    taking the sample off an intertidal zone ground by a lift of the unmanned aerial vehicle, and recovering the sampler with the winch;
    after recovery is completed, moving the unmanned aerial vehicle to an initial position, and after the sample is disposed, moving the unmanned aerial vehicle to a next sampling position to carry out a next sampling of the surface sediments in the intertidal zone;
    before releasing the sampler, comprising acquiring an image of a sampling position, and judging the image of the sampling position; and if a judgment result shows an exposure of the surface sediments, manually operating to release the sampler; if the image shows coverage of the sampling position with seawater, manually controlling to wait, move again or return;
    judging by the image of the sampling position returned by the unmanned aerial vehicle; and
    after moving to the sampling position, judging whether the seawater in the intertidal zone recedes and whether the surface sediments in the intertidal zone are exposed, and correcting a height of the unmanned aerial vehicle according to a surface height; after moving to a current position, collecting an image at the current position through an image sensor installed on the unmanned aerial vehicle, and processing the image to judge whether the surface sediments are exposed; after a judgment is completed, if a judgment result shows a presence of the surface sediments, returning a release signal and a collected image, and using the sampler for sampling through a manual operation control; if the surface sediments are not present, returning the collected image to relevant personnel for review to judge whether to wait or return to the initial position or directly sample; in a process of judging the image of the surface sediments, performing detection and classification of the image by a deep learning model, wherein the classification is whether the surface is exposed, and the deep learning model selects a convolution neural network, and the convolution neural network selects a structure with a plurality of convolutional modules and fully connected layers connected; and burning a program of the deep learning model by a microprocessor mounted on the unmanned aerial vehicle for identification; if the identification shows an exposure of the surface sediments, controlling the sampler to sample; if the identification shows no exposure of the surface sediments, returning a currently judged image to the relevant personnel for review; and in this case, replacing a control model of the unmanned aerial vehicle from automatic control to manual control, and using remote manual control instructions to enable the unmanned aerial vehicle to perform behaviors of waiting, returning to the initial position, or directly sampling; wherein a sampling process needs to be at a low tide time, but a surface of the intertidal zone under the sampling position at the low tide time may not be completely exposed, and an existence of water on the surface has a certain impact on the sampling process and final sampling results; therefore, there is a need to avoid sampling when there is water in the intertidal zone as much as possible; meanwhile, in order to improve an automatic control mode of the unmanned aerial vehicle, when a judgement shows no exposure of the surface, the unmanned aerial vehicle moves to a central position of a plurality of adjacent grids for an image judgment again, and records central position information of the adjacent grids; after judging the central position of the plurality of adjacent grids, if there is a phenomenon of surface exposure, the sampler is used to sample directly; if there is still no content exposed on the surface, a control mode is handed over to remote manual control or returning directly is selected, and collected image data is transmitted to the relevant personnel for review.

2. The sampling method for the surface sediments in the intertidal zone according to claim 1, wherein
    a bottom of the unmanned aerial vehicle is equipped with the releaser, and the winch is provided with a steel cable, and the sampler is arranged at an end of the steel cable; and the releaser controls the winch to release and recover the steel cable to drive the sampler to release and recover.

3. The sampling method for the surface sediments in the intertidal zone according to claim 1, wherein
    a movement of the unmanned aerial vehicle uses the manual control or the automatic control.

4. The sampling method for the surface sediments in the intertidal zone according to claim 3, wherein
    in the automatic control mode of the unmanned aerial vehicle, the sampling position is taken as a final position, a position of the unmanned aerial vehicle is taken as the initial position, and obstacle avoidance grids are marked; according to the initial position, the final position and the obstacle avoidance grids, a path is planned by an optimization algorithm, and the unmanned aerial vehicle is automatically controlled through a planned path.

5. The sampling method for the surface sediments in the intertidal zone according to claim 1, wherein
    the height of the unmanned aerial vehicle is 5-10 m.

6. The sampling method for the surface sediments in the intertidal zone according to claim 1, wherein
    before the sampler is released, hovering the unmanned aerial vehicle through a fixed-point hovering function is also comprised, wherein a hovering duration depends on a sampling duration and a battery power of the unmanned aerial vehicle.

\* \* \* \* \*